Feb. 2, 1960 S. R. TEICH 2,923,862

ELECTRONIC CONTROL DEVICE FOR CUTTING OFF SIGNAL APPARATUS

Filed June 15, 1956 2 Sheets-Sheet 1

INVENTOR.
SIDNEY R. TEICH

BY J.B. Felshin

ATTORNEY

ELECTRONIC CONTROL DEVICE FOR CUTTING OFF SIGNAL APPARATUS

Filed June 15, 1956 2 Sheets-Sheet 2

INVENTOR.
SIDNEY R. TEICH
BY
J. B. Felshin
ATTORNEY

United States Patent Office 2,923,862
Patented Feb. 2, 1960

2,923,862

ELECTRONIC CONTROL DEVICE FOR CUTTING OFF SIGNAL APPARATUS

Sidney R. Teich, Westbury, N.Y.

Application June 15, 1956, Serial No. 591,707

15 Claims. (Cl. 317—142)

This invention relates to an electronic control device for automatically cutting off electronically transmitted high frequency signal apparatus upon loss of the signal or decrease of the signal below a predetermined value.

Difficulty has been experienced with electronic apparatus, for example, electronically transmitted signal apparatus resulting from loss of signal or decrease of signal below a predetermined point. Such apparatus when left turned on, or connected to a source of electric power for long periods of time after the signal is off, sometimes creates a great fire hazard. As an example, it is noted that there are times when a person might watch television and fall asleep. When the station to which the television tuned terminates its operation for the night, the signal goes off, but the television set is nevertheless still energized. The set remains energized during the night and gets overheated and may possibly cause fire.

It is therefore an object of the present invention to provide an automatic cut off unit or device which begins to function at a predetermined time delayed period after the signal disappears or is reduced below a predetermined signal strength to automatically turn off the apparatus.

It is a further object of the present invention to provide in a unit of the character described, blinker means or other electric indicating means to indicate when the unit goes into operation and turns off the electronic apparatus. Operation of the said indicating means shows that the signal in the apparatus has disappeared or is below a predetermined point. It may indicate that there is difficulty in the set, or that the apparatus has been turned off; also that the automatic cut off unit is operating.

Yet a further object of this invention is to provide in an automatic cut off unit of the character described, means to reactivate the apparatus controlled by merely turning the regular "on" and "off" switch, first to the "off" position and then again to the "on" position.

It will be noted that this invention is not strictly limited to control of television apparatus, as the invention may be embodied in units controlling any electronic device that receives or operates on an existing signal.

The present invention is directed to any automatic circuit breaker which operates to cut off any electronic device when a signal in said device for any reason disappears or is removed.

Thus, a unit of the character described may be connected to control any apparatus which requires an antenna. The unit will operate upon removal of the antenna wires from the apparatus. It will also operate if the tube fails or if one of the elements of the tube such as the plate or the grid becomes shorted.

Yet a further object of this invention is to provide a unit of the character described that may be incorporated into a new electronic apparatus or which may serve as an attachment for an existing apparatus.

Still a further object of the present invention is to provide a durable and reliable unit of the character described, which will be relatively inexpensive to manufacture, and which will be sure and positive in operation and practical and efficient to a high degree in use.

Other objects of this invention will be obvious in part and in part be hereinafter pointed out.

The invention accordingly consists in the features of construction, combinations of elements, and arrangement of parts, which will be exemplified in the construction hereinafter described, and of which the scope of invention will be indicated in the appended claims.

In the accompanying drawings in which are shown various illustrative embodiments of this invention;

Figures 1, 2:
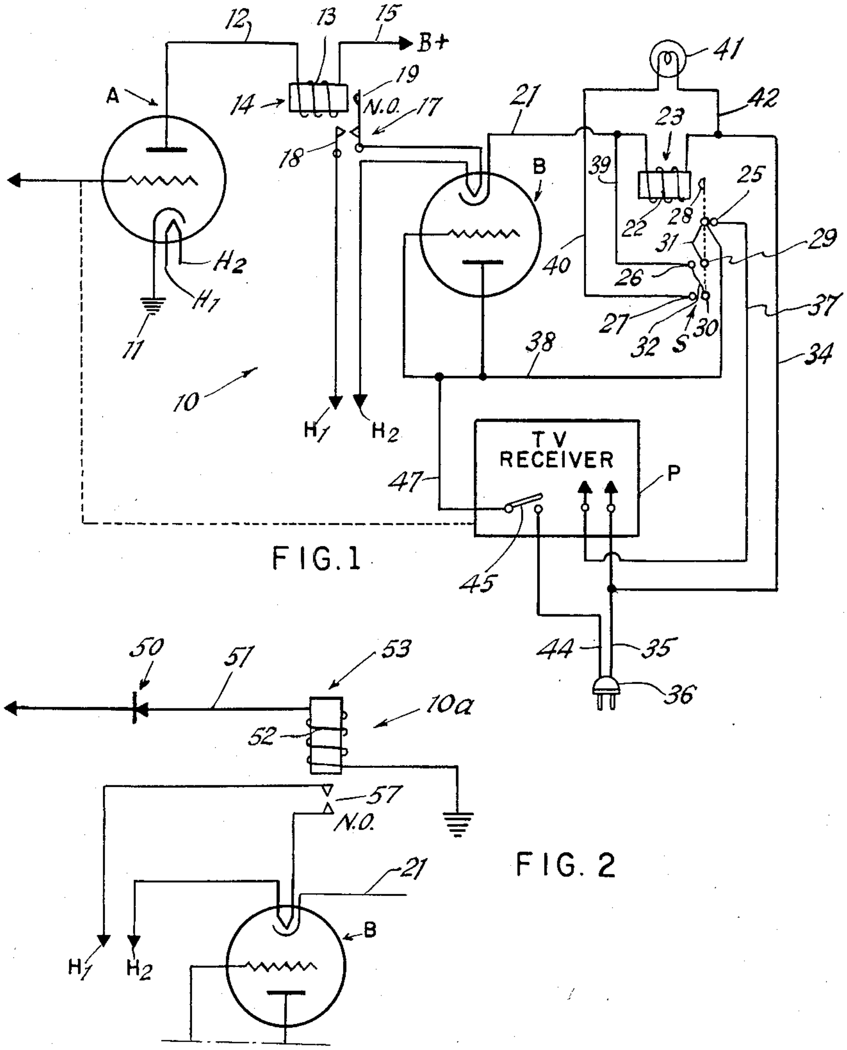
Fig. 1 is a wiring diagram illustrating a unit embodying the invention.
Fig. 2 is a wiring diagram illustrating a modified hookup.

The unit embodying the invention designated by numeral 10 comprises a vacuum tube A which is here shown as a triode, although any suitable vacuum tube, such as a diode, may be employed, in a suitable circuit. Tube A may also be replaced by any electronic means, such as a transistor or germanium rectifier. The grid of the tube A may be connected to the intermediate frequency amplifier of the apparatus to be controlled or to the part of the apparatus in which the radio frequency signal exists. The cathode of the tube A is connected to the ground as at 11. The plate of tube A is connected by wire 12 to the coil 13 of relay 14. Said coil is connected by wire 15 to any appropriate B+ point in the apparatus to be controlled depending upon the requirements of tube A. The wire 15 may be connected generally to the D.C. voltage source of the apparatus to be controlled or to any suitable D.C. source from a power supply.

The unit 10 further comprises a vacuum tube B which is likewise here shown as a triode, although any suitable vacuum tube may be employed. The heater of tube B is connected through switch 17 to the heater supply, to the low voltage filament transformer of the apparatus to be controlled, or to any other low voltage current source. The switch 17 comprises a fixed switch arm 18 and a movable switch arm 19 normally not contacting the fixed switch 18, but adapted to close and contact the switch 18 when the relay 14 is energized. The heater for tube A is also connected to a low voltage source.

The cathode of tube B is connected by wire 21 to one side of the coil 22 of relay 23. The heater for the cathode of tube B is in series with switch 17 and receives low voltage current. It may be connected in parallel with the heater for tube A or to the heater source supply of the apparatus to be controlled. Relay 23 controls a multiple switch S. The multiple switch comprises a single fixed contact 25 and a pair of fixed contacts 26 and 27. The switch S further comprises a movable switch arm carrying contacts 28, 29 and 30. The contact 28 normally engages contact 25 when the relay 23 is deenergized. At that time, contact 29 is spaced from contact 26, and contact 30 is spaced from contact 27. When the relay 23 is energized, contact 28 moves away from contact 25, contact 29 moves into engagement with contact 26, and contact 30 moves into engagement with contact 27. Contacts 28 and 29 are connected by a jumper 31. Contacts 26 and 30 are interconnected by a jumper 32.

The coil 22 of relay 23 is connected by a wire 34 to one lead 35 of a plug 36 which may be plugged into any source of current, for example, a house outlet. The wire 35 is connected to one lead of the electronic apparatus P to be controlled designated by a box marked "TV Receiver." Contact 25 is connected by wire 37 to the other lead of said electronic apparatus P. The plate and grid of tube B are connected by wire 38 to contact 28. Contact 26 is connected by wire 39 to the wire 21. Contact 27 is connected by wire 40 to one side of a blinker or other electric indicator 41, the other side of the indicator being connected by the wire 42 to the wire 34. The second lead 44 of the plug 36 is connected to one side of the normal apparatus switch for the electric apparatus to be controlled and designated by numeral 45. The other side of the switch 45 is connected by wire 47 to wire 38.

The operation of the unit will now be described.

When there is a signal in the electronic apparatus P to be controlled, there is a negative signal bias on the control grid of the grid A. This condition prevents any plate curent from flowing in the plate circuit of the tube A and makes the entire unit 10 inoperative. However, when the signal in the electronic apparatus P, to be controlled, disappears, or is lowered in intensity below a predetermined threshold value, tube A begins to conduct and there is a plate current flowing said tube. Such current energizes the relay 14 causing the switch 19 on the relay to close, which in turn applies current to the heater element of tube B. The heating of the heater for tube B may take any predetermined time, such as between ten and twenty seconds. This time delay can be varied by changing the tube to a more rapidly or more slowly heating element. If desired, any suitable time delay device, electronically or otherwise, may be interposed in the circuit to control the heat of the heating element of tube B, or if desired, the relay 14 may be a time delay relay.

The reason this time delay is necessary is to prevent the electronic apparatus from being disconnected upon a temporary lapse of signal or when changing stations on an apparatus, such as a television set.

When the tube B warms up sufficiently, current begins to flow in the circuit of tube B, thus energizing relay 23, thereby opening switch 28, 25, which is in series with the source of voltage to the electronic apparatus P, thus turning off the entire apparatus. Upon energizing relay 23, switch 26, 29 closes, which applies source of voltage directly across the relay 23 to hold it energized even if tube B should become inoperative.

It will of course be understood that when the source of voltage to the apparatus P is cut off, all voltage to the tubes A and B is cut off, as well as to the rest of the apparatus P.

Switch 27, 30 is used to apply voltage to the pilot light or blinker 41 to indicate discontinuance of the apparatus P by this automatic cut off device.

To reactivate the electronic apparatus P, switch 45 is first turned "off," and then "on" again. If the trouble which may exist in the apparatus P has not been rectified, the automatic unit 10 will again turn off the apparatus after a time delay of ten or twenty seconds or other predetermined time delay, and the indicator 41 will go "on" again. If the unit 10 has turned off the apparatus P only because the signal source has ceased to exist, due to termination of transmission operations of a given station, it is only necessary to turn apparatus switch first "off" and then "on" again to resume normal operations.

In Fig. 2 there is shown a unit **10*a* embodying the invention and illustrating a modification. In unit 10*a* the tube A is replaced by a germanium crystal rectifier 50, likewise connected to the part of the apparatus P in which the radio frequency signal exists. The germanium rectifier 50 is connected by wire 51 to the coil 52 of a sensitive relay 53. Said coil 52 is connected to ground as shown in the drawing. Relay 53 controls a normally closed switch 57** in series with the heater of tube B and connected to receive low voltage current from apparatus P or from any other suitable source.

The rest of unit **10*a* may be the same as the unit 10. When there is a signal in the apparatus P, a current passes through the germanium crystal 50 and the coil of relay 53. This current operates the relay which causes normally closed switch 57 to open. However, when the signal fails or is reduced below a preselected threshold, the current through the relay drops, thereby causing switch 57** to close, thereby heating the heater for tube B which causes the power to the apparatus P to be cut off as explained above. The heater may be of a time delay type.

It will be noted that in the usual electronic apparatus, wire 47 connects the normal apparatus switch 45 to contact 25, so that opening of the switch 45 cuts out the apparatus. In the present hook-up, opening of the switch 45 will cut out the apparatus P, as will also the opening of the switch 25, 28 as explained hereinabove. Opening of switch 45 will of course not only cut out the apparatus P but will also cut out tube B.

Figure 3:
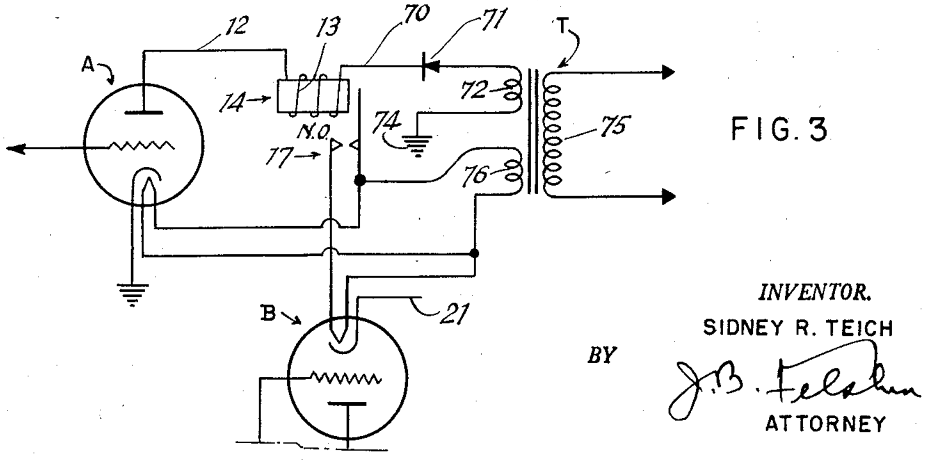
Fig. 3 is a wiring diagram illustrating a further modification.

In Fig. 3 there is shown another modification illustrating a more self-contained unit.

In Fig. 3 the plate of tube A is connected by wire 12 to coil 13 of relay 14. Said coil may be connected by wire 70 through selenium rectifier 71 to a secondary 72 of transformer T. Said secondary 72 may be grounded as at 74. The primary 75 of the transformer may be connected to any suitable A.C. voltage source. Another secondary 76 may be connected to supply low voltage to the heaters for both tubes A and B, and is controlled by the switch 17. The remainder of the hook-up follows Fig. 1. With such a hook-up, the unit may be more easily attached to the apparatus P, it merely being necessary to connect the grid of tube A to a portion of the circuit of said apparatus in which high frequency signal exists. The heater for tube A is always in circuit with the secondary 76 while the heater for tube B is energized only when switch 17 is closed. The only other change in the apparatus P that would be necessary is the following:

Ordinarily, the normal apparatus switch 45 is connected in series with the apparatus. The change that would have to take place is to connect one terminal of the apparatus through the wire 37 to contact 25 and to connect contact 28 to one side of switch 45. The other side of the apparatus could be connected to one terminal of the plug 36, and the other side of the switch 45 would be connected to the other terminal of the plug 36.

Figure 4:
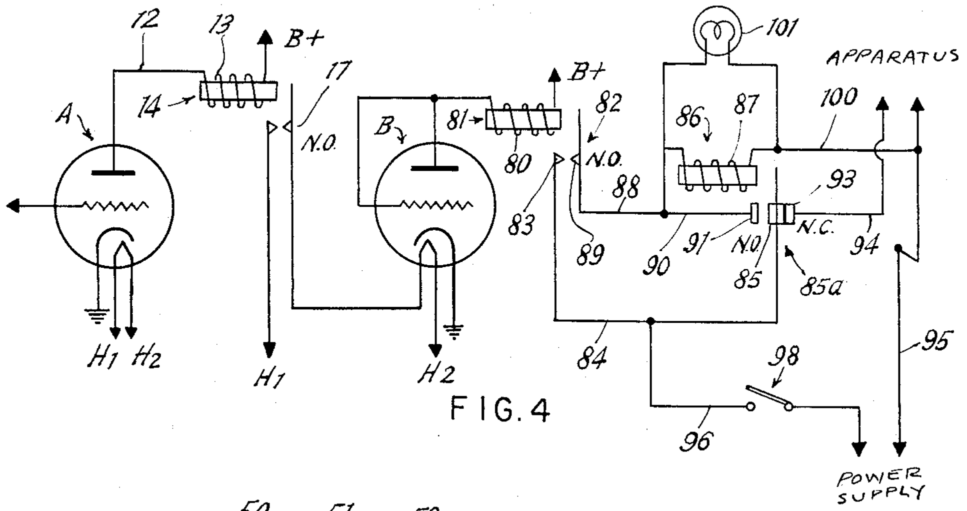
Fig. 4 is a wiring diagram similar to Fig. 1 and illustrating a modified arrangement.

In Fig. 4 there is shown another modification. In said figure, vacuum tube A is likewise employed, as in Fig. 1, and its plate is connected by wire 12 through coil 13 of relay 14 and wire 15 to the B+ of the apparatus to be controlled. Relay 14 when energized, closes normally open switch 17 which controls the heater for the vacuum tube B.

The grid and plate of tube B are connected to coil 80 of relay 81. Said coil 80 is also connected to the B+ of the apparatus to be controlled.

Relay 81 when energized, closes normally open switch 82. Said switch 82 comprises a fixed contact 83 connected by wire 84 to a movable contact 85 of switch **85*a* controlled by relay 86. The coil 87 of relay 86 is connected by wire 88 to the movable switch 89 of said switch 82, and by wire 90 to fixed contact 91 of said switch 85*a*. Said switch 85*a* further comprises a fixed contact 93 connected by wire 94 to one terminal of the apparatus to be controlled. The other terminal of said apparatus is connected by wire 95 to one side of the power supply. The other side of the power supply is connected by wire 96 through the manual "on" and "off" switch 98 of the apparatus, to wire 84. The contacts 85, 93 of switch 85*a* are normally closed, whereas contacts 85 and 91 of said switch are normally open. Coil 87 is connected by wire 100** to said other terminal of said apparatus to be controlled.

When the signal in the apparatus to be controlled fails, the grid of tube A allows current to flow through said tube to energize relay 14 and close switch 17, thereby heating the heater for tube B and allowing current to flow therethrough. Current through tube B will energize relay 81 to close switch 82. Current will then be supplied to coil 87 of relay 86 (switch 98 being closed). When relay 86 is energized, switch contacts 85 and 93 open and contacts 85, 91 close, thereby breaking the current supply to the apparatus to be controlled, and providing a holding current for the relay coil 87, so that it remains energized even when relay 81 is de-energized.

Thus, the power to the apparatus to be controlled will be shut off automatically, and the signal to said apparatus goes below a predetermined value or disappears.

A signal indicator 101 connected across relay coil 87 indicates power shut off to said apparatus. To restore power to said apparatus (after the necessary repairs have been made), first open switch 98 to cut out relay 86 and then close said switch again.

Figures 5, 6:
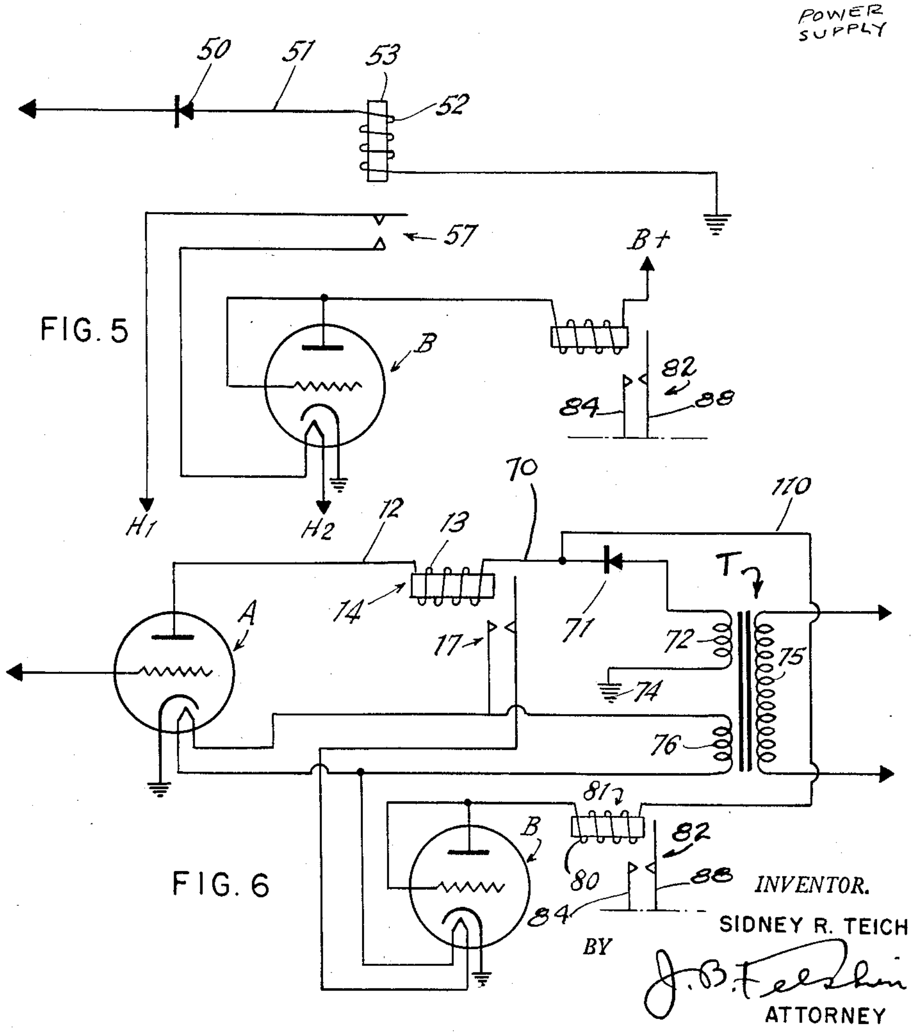
Fig. 5 is a wiring diagram similar to Fig. 2 and illustrating a modified construction.
Fig. 6 is a wiring diagram similar to Fig. 2 and illustrating a still further modification.

In Fig. 5, tube A is eliminated and as in Fig. 2, switch 57 controlling the heater for tube B is controlled by relay 53, the coil of which is connected through germanium rectifier 50, part of the apparatus to be controlled in which the signal exists. Said coil 52 is connected to ground, as shown in the drawing. The rest of the circuit is as shown in Fig. 4.

In Fig. 6 the plate of tube A is connected by wire 12 to the coil 13 of relay 14. Said relay 13 is connected by wire 70 through selenium rectifier 71 and through a secondary 72 of transformer T, to ground as at 74. The primary 75 of said transformer T is connected to a suitable A.C. voltage source. The other secondary 76 supplied low voltage to the heater of tube A and also supplies low voltage to the heater of tube B when normally open switch 17 is closed by energization of relay 14 when the signal in the apparatus to be controlled fails.

The remainder of the circuit is, as shown in Fig. 4, except that coil 80 of relay 81 is connected by wire 110 through selenium rectifier 71 to the secondary 72 at the transformer T.

It will thus be seen that there is provided a unit and system in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. An electronic control unit for automatically cutting off an electronically transmitted signal apparatus upon loss of signal or decrease of signal below a predetermined signal strength in said apparatus, said unit comprising a tube having its grid connected to the part of the circuit of the apparatus within which the signal exists, the cathode for said tube being grounded, a heater for the cathode of the tube, a relay having a coil in the plate circuit of said tube, means to connect said coil to a D.C. power supply, a switch controlled by said relay, a second tube having a heater in series with said switch, means to supply voltage to said heaters, said switch controlling the voltage supply means for the heater of the second tube, a second relay having a coil in series with the grid and plate of the second tube and with the cathode for said second tube, and a normally closed switch controlled by the second relay and in series with said apparatus.

2. The combination of claim 1, in combination with hold means to hold said normally closed switch in open condition independently of said second tube.

3. In an electronic control unit for automatically cutting off power to electronic apparatus which includes a circuit within which a signal may exist, said unit comprising a tube, a circuit for said tube, said tube having a grid adapted to be connected to the apparatus circuit whereby when the signal in said apparatus circuit is above a predetermined value, flow of current through said tube is prevented, and whereby when the signal in said apparatus circuit is below said predetermined value, current is allowed to flow through said tube, a cathode for said tube connected to ground, a heater for said cathode, means to supply voltage to said heater, a second tube, a heater for the second tube, means to supply voltage thereto, a cathode for said second tube, a plate circuit for said second tube connecting the plate and grid of the second tube to the cathode of the second tube, means to connect said apparatus in parallel with said circuit for said second tube, common means to supply voltage to said apparatus and plate circuit, a normally closed switch in series with said apparatus, means controlled by flow of current through the first tube and controlling the voltage supply means for the heater of the second tube, to cause flow of current through the second tube, and means controlled by flow of current through said second tube and plate circuit thereof to open said switch for de-energizing said apparatus.

4. The combination of claim 3, in combination with means to hold said switch in open position even when current stops flowing through the second tube.

5. The combination of claim 4, in combination with electric indicator means to indicate when said switch has been opened, and means controlled by said switch to connect said indicator means in parallel with said plate circuit.

6. The combination of claim 3, the means associated with the first tube to control the flow of current for the second tube, including a time delay means.

7. In combination with electronic apparatus in which a high frequency signal may exist, a normally closed switch in series with said apparatus, a circuit, means in said circuit to open said switch to cut off said apparatus, a vacuum tube, a source of voltage for said vacuum tube, means sensitive to the signal in said electronic apparatus to cause current to flow in said tube, and means controlled by said tube to cause current to flow in said circuit for actuating said first means to cause it to open said switch.

8. The combination of claim 7, said second means including time delay means for controlling flow of current in said circuit.

9. A unit for automatically cutting off apparatus in which high frequency signal exists upon reduction of signal below a threshold, said unit comprising electrical means sensitive to the signal and adapted for connection to the part of the apparatus in which the signal exists, a relay controlled by said sensitive means, means to supply voltage to the coil of said relay, a vacuum tube, means to supply voltage to the heater for said tube, switch means controlled by the actuation of said relay and controlling the voltage supply means for the heater, to heat the heater for said tube, a normally closed switch in series with said apparatus, and means controlled by flow of current through said tube to open said second switch for cutting out said apparatus.

10. The combination of claim 9, said heater and tube being selected so that a predetermined period of heating of the heater is required before current will flow through said tube.

11. An electric control unit for automatically cutting off power in an apparatus in which a high frequency signal may exist, said unit comprising means sensitive to such signal in said apparatus, and adapted to be attached to the part of the apparatus in which the signal exists, a vacuum tube, means to supply voltage to the heater for said tube, means controlled by said sensitive means to control the means for supplying voltage to the heater for said tube, a relay having a coil in series with the tube, a normally closed switch controlled by said relay, said switch being adapted for connection in series circuit with said apparatus, and means controlled by a flow of current through said tube to energize said relay coil and open said switch for cutting off power to said apparatus.

12. The combination of claim 11, and a manual switch connected in series circuit with said tube and adapted to be connected in series with said apparatus.

13. In an electronic cyontrol unit for automatically cutting off power to an electronic apparatus which includes a circuit within which a signal may exist, said unit comprising a tube, said tube having a grid adapted to be connected to the apparatus circuit whereby when the signal in the apparatus circuit is above a predetermined value, flow of current through said tube is prevented, and whereby when the signal in said apparatus is below said predetermined value, current is allowed to flow through said tube, means to supply voltage to the heater for said tube, a second tube, means to supply voltage to the heater for the second tube, a circuit for said second tube, a switch controlling the means to supply voltage to the heater of the second tube, means controlled by the circuit for the first tube when current flows therethrough to close the switch, whereby to heat the heater for the second tube, a relay having a coil connected at one end to the plate and grid of the second tube and to a source of D.C. power at its other end and said coil being controlled by current flowing through the second tube, a switch controlled by said relay, another relay, a power circuit for the coil of said last relay, said last switch being in said last circuit, a normally closed switch adapted to cut off power to said apparatus, and means controlled by the last relay to open the apparatus switch for shutting off power to said apparatus.

14. In combination, an electronic circuit sensitive to the presence of a signal in an apparatus to be controlled, a relay having a coil in said circuit connected to be energized when there is a signal in the apparatus, a switch controlled by said relay, a vacuum tube, means to supply voltage to the heater for said tube, means controlled by the switch, for controlling the means to supply voltage to the heater for said vacuum tube, a circuit for said vacuum tube connecting the plate and grid thereof to a source of D.C. power, a second relay having a coil in said circuit and connected to be energized when current flows through said last circuit, a second switch controlled by said second relay, a circuit for said second switch, means to supply power to the third circuit, a normally closed switch controlling the apparatus to be controlled, and a third relay having a coil in the third circuit and controlled by said second relay switch, for controlling the apparatus switch.

15. The combination of claim 14, and means for retaining the apparatus switch open even when the second relay is de-energized.

References Cited in the file of this patent

UNITED STATES PATENTS

| | | |
|---|---|---|
| 1,635,779 | Carter | July 12, 1927 |
| 1,804,526 | Coxhead | May 12, 1931 |
| 2,090,531 | Hardin | Aug. 17, 1937 |
| 2,559,959 | Hipps | July 10, 1951 |
| 2,635,213 | Bruene | Apr. 14, 1953 |